(12) United States Patent
Cheng et al.

(10) Patent No.: US 11,007,828 B2
(45) Date of Patent: May 18, 2021

(54) VALVE STEM STRUCTURE AND TIRE PRESSURE MONITORING SYSTEM USING THE SAME

(71) Applicant: One Unique Inc., Taichung (TW)

(72) Inventors: Yuan-Lung Cheng, Taichung (TW); Kou-Liang Chao, Hsinchu County (TW); Chieh-Yi Sung, Hsinchu County (TW)

(73) Assignee: One Unique Inc., Taichung (TW)

( * ) Notice: Subject to any disclaimer, the term of this patent is extended or adjusted under 35 U.S.C. 154(b) by 193 days.

(21) Appl. No.: 16/231,618

(22) Filed: Dec. 24, 2018

(65) Prior Publication Data

US 2019/0193491 A1 Jun. 27, 2019

(30) Foreign Application Priority Data

Dec. 26, 2017 (CN) .......................... 201721841165.7
Apr. 23, 2018 (CN) .......................... 201820580493.4

(51) Int. Cl.
*B60C 23/04* (2006.01)
*B60C 29/00* (2006.01)
*B60C 29/04* (2006.01)

(52) U.S. Cl.
CPC ........ *B60C 23/0494* (2013.01); *B60C 23/041* (2013.01); *B60C 23/0447* (2013.01); *B60C 29/005* (2013.01); *B60C 29/04* (2013.01)

(58) Field of Classification Search
CPC . B60C 23/0494; B60C 23/041; B60C 29/005; B60C 23/0447; B60C 29/04
See application file for complete search history.

(56) References Cited

U.S. PATENT DOCUMENTS

| 4,163,208 A * | 7/1979 | Merz ..................... B60C 23/007 200/61.25 |
| 2011/0192221 A1* | 8/2011 | Wang ................. B60C 23/0496 73/146.8 |

* cited by examiner

*Primary Examiner* — Xin Y Zhong
(74) *Attorney, Agent, or Firm* — JCIPRNET (57) ABSTRACT

A valve stem structure disposed at a rim of a tire of a vehicle for connecting to an electronic tire pressure monitoring device in the tire is provided. The valve stem structure includes a tube, an air core, and a conducting wire. The tube has a first inlet, a first outlet communicating with an inner space of the tire, and a second outlet. The air core is switchably disposed at the first inlet, and a compressed air is injected into the tire via the first inlet and the first outlet by switching the air core. The conducting wire is disposed in the tube, and an end of the conducting wire extends out of the tube via the second outlet to be electrically connected to the electronic tire pressure monitoring device. A power source charges the electronic tire pressure monitoring device via the conducting wire.

17 Claims, 11 Drawing Sheets

VALVE STEM STRUCTURE AND TIRE PRESSURE MONITORING SYSTEM USING THE SAME

CROSS-REFERENCE TO RELATED APPLICATION

This application claims the priority benefits of China application no. 201721841165.7, filed on Dec. 26, 2017, and China application no. 201820580493.4, filed on Apr. 23, 2018. The entirety of each of the above-mentioned patent applications is hereby incorporated by reference herein and made a part of this specification.

BACKGROUND

Technical Field

The disclosure relates to a valve stem structure and a tire pressure monitoring system using the same.

Description of Related Art

The present law has expressly provided that new vehicles currently on the market are required to have a tire pressure monitoring device installed at the time of licensing so as to prevent an accident caused by a flat tire due to abnormal tire pressure.

Generally speaking, the tire pressure monitoring device is electronic and is a pressure sensor manufactured by using a micro-electromechanical process of an integrated circuit. This kind of electronic tire pressure monitoring device includes a transmitting circuit and a receiving circuit. The transmitting circuit is disposed in the integrated circuit of the electronic tire pressure monitoring device, while the receiving circuit is provided on or near a vehicle dashboard or be connected to an electronic control unit (ECU) for the driver's easy observation. The tire pressure value detected by the electronic tire pressure monitoring device is sent out via wireless signals by the transmitting circuit and is received by the receiving circuit to be displayed.

Herein the receiving circuit is disposed in the vehicle so that the power required for its operation comes from the power of the vehicle. However, the power required to operate the transmitting circuit comes from a battery disposed in the electronic tire pressure monitoring device. Accordingly, when the power of the battery is exhausted, it is necessary to replace the old battery with a new one. Nevertheless, in the tire pressure monitoring device disposed inside the tire currently sold on the market, the battery and the tire pressure monitoring device are sealed in one sub-module block. Therefore, after the battery is exhausted, it is necessary to replace the entire sub-module block that contains the battery and the tire pressure monitoring device to make the transmitting circuit of the tire pressure monitoring device operate normally and fulfill its proper functions. Consequently, the driver's expenses are increased, including the cost of the entire sub-module block (generally speaking, it is necessary to replace four blocks in total for a single operation of tire positioning), the expenses to remove the tire, install the sub-module block and reposition and calibrate the tires and so on. The whole procedure is not only time-consuming but also causes inconvenience and extra expenditures.

SUMMARY

The disclosure provides a valve stem structure and a tire pressure monitoring system using the same, in which an electrical circuit and an air circuit are both disposed inside a tube of the valve stem structure so that a rechargeable battery cell provided in an electronic tire pressure monitoring device may be charged when the power is insufficient. After the charging is completed, the battery cell is able to provide the power required for normal operation of the electronic tire pressure monitoring device.

The valve stem structure of this disclosure is disposed at a rim of a tire of a vehicle for connecting to an electronic tire pressure monitoring device, wherein the electronic tire pressure monitoring device is disposed in the tire.

In a first embodiment, the valve stem structure includes a tube, an air core, and a conducting wire. The tube has a first inlet, a first outlet communicating with an inner space of the tire, and a second outlet. The air core is switchably disposed in the tube and located at the first inlet, wherein a compressed air is injected into the valve stem structure via the first inlet by switching the air core and is injected into the tire via the first outlet. The second inlet is airtight and is provided with a battery cell socket. The conducting wire is disposed in the tube and extends out of the valve stem structure via the second outlet to be electrically connected to a battery cell of the electronic tire pressure monitoring device. The conducting wire, which is double-core, is connected to an anode and a cathode of the battery cell respectively, and is insulated from the main body of the valve stem structure.

In a second embodiment of the disclosure, a first inlet of the valve stem structure is provided with an air core. Where the air core is passed, a flat and even area is formed on the main body of the valve stem structure and is divided into two conductive areas that are insulated from each other and are each insulated from the main body of the valve stem structure. Each of the conductive areas has a metal protrusion that is magnetic and has an inner space connected to positive and negative ends of a conducting wire respectively, and herein a second inlet that is airtight is provided for power transmission only. The conducting wire passes through an inner space of the tube to be respectively connected to an anode and a cathode of the battery cell of the electronic tire pressure monitoring device via a second outlet. When the power of the battery cell is insufficient, a magnetic charging cable may be used to connect to the aforementioned flat and even area so as to charge the rechargeable battery cell.

In a third embodiment of the disclosure, an air core is disposed at a first inlet and is provided with a rod that is conductive. A plating layer of an insulating material is provided on the middle section of the rod so that the rod is insulated from the main body of the valve stem structure. An end portion of the rod is connected to a single-core conducting wire, and an end of the conducting wire is electrically connected to an anode of the rechargeable battery cell of the electronic tire pressure monitoring device via a second outlet. In addition, another single-core conducting wire is connected between an inner space of the main body of the valve stem structure and a cathode of the rechargeable battery cell of the electronic tire pressure monitoring device. When the valve stem structure is fastened to the rim of the tire, the two sides are respectively provided with rubber cushion rings so that the main body of the valve stem structure is isolated from the rim of the tire. In this way, the main body of the valve stem structure is conductive and is connected to the cathode of the battery cell, and the rod of the air core is insulated from the main body of the valve stem structure and is connected to the anode of the battery cell. When the power of the battery cell is insufficient, an end of a magnetic sleeve is used to magnetically attract the rod of the air core that is connected to the anode of the battery cell, and an outside of the sleeve is connected to the main body of the valve stem structure to be connected to the cathode of the battery cell. The rechargeable battery cell is charged in this manner.

In a fourth embodiment of the disclosure, a tube of the valve stem structure includes a main section and a branch section, and a passage of the main section and a passage of the branch section are structurally separated and independent from each other. That is to say, the passage for air and the passage for electricity are separated from each other so that air and electricity are separated without interfering with each other, thereby preventing the functions of inflation and electrical conduction of the valve stem structure from being affected. At the same time, such configuration may also reduce the length of the passage of the tube, thereby avoiding the situation where the portion of the valve stem structure exposing out of the tire is too long and thus easily damaged during driving.

In a fifth embodiment of the disclosure, a tube of the valve stem structure is an integrally formed structure and is divided into a main section and a branch section, and more importantly, a passage of the main section and a passage of the branch section are communicated with each other. Specifically, an air core is disposed at the branch section, and a power source, for example, a battery box, is fixed at an end of the main section, wherein a battery cell socket is also disposed at the end of the main section to be electrically connected to a battery of the power source. In this way, the battery may supply power to the electronic tire pressure monitoring device via the battery cell socket and a conducting wire by passing through the main section.

In the embodiment, the power source further comprises a cover for covering and being electrically connected to conducting piece, such that the electrodes of the battery is electrically connected to the battery cell socket, and the electrode being faced toward a conducting spring of the cover is connected to the socket through the conducting piece. While the cover being assembled to the portion, the conducting spring is contacted and electrically connected the conducting piece with the electrode. Therefore, a circuit loop is formed by the battery cell socket, the battery, the cover, and the conducting piece.

In the embodiments of the disclosure, the valve stem structure, besides performing the function of inflation, is additionally provided with an electrical connector to be electrically connected to the battery cell of the electronic tire pressure monitoring device via the conducting wire, so that the main body of the valve stem structure has both the structures of an air core and a battery cell and possesses both the functions of inflation and electrical conduction.

The tire pressure monitoring system of this disclosure includes the tire pressure monitoring device and the valve stem structure.

Based on the foregoing, in the embodiments of the disclosure, the valve stem structure and the tire pressure monitoring system using the same are equipped with the conducting wire disposed in the inner space of the tube. Accordingly, not only is the function of tire inflation provided by the valve stem structure, power may also be supplemented to the rechargeable battery of the electronic tire pressure monitoring device by the conducting wire that serves as a medium of electrical connection. In this way, when the power is exhausted, it is not necessary to remove the tire to replace the sub-module block of the electronic tire pressure monitoring device disposed inside the tire. As a result, the user's convenience is improved, the user's expenses are reduced, and purposes of energy conservation, environmental protection and money-saving are achieved. In the fifth embodiment of the disclosure, the tire pressure monitoring device using a disposable battery, the disposable battery may also be removed from the tire pressure monitoring device inside the tire and be placed in a battery box attached to the second inlet of the valve stem structure (located outside the tire). In this way, when exhausted, the battery may be directly replaced from outside the tire. There is no need to purchase a new module, remove the tire to replace the battery and reposition the tire, thereby saving unnecessary expenditures for consumers.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
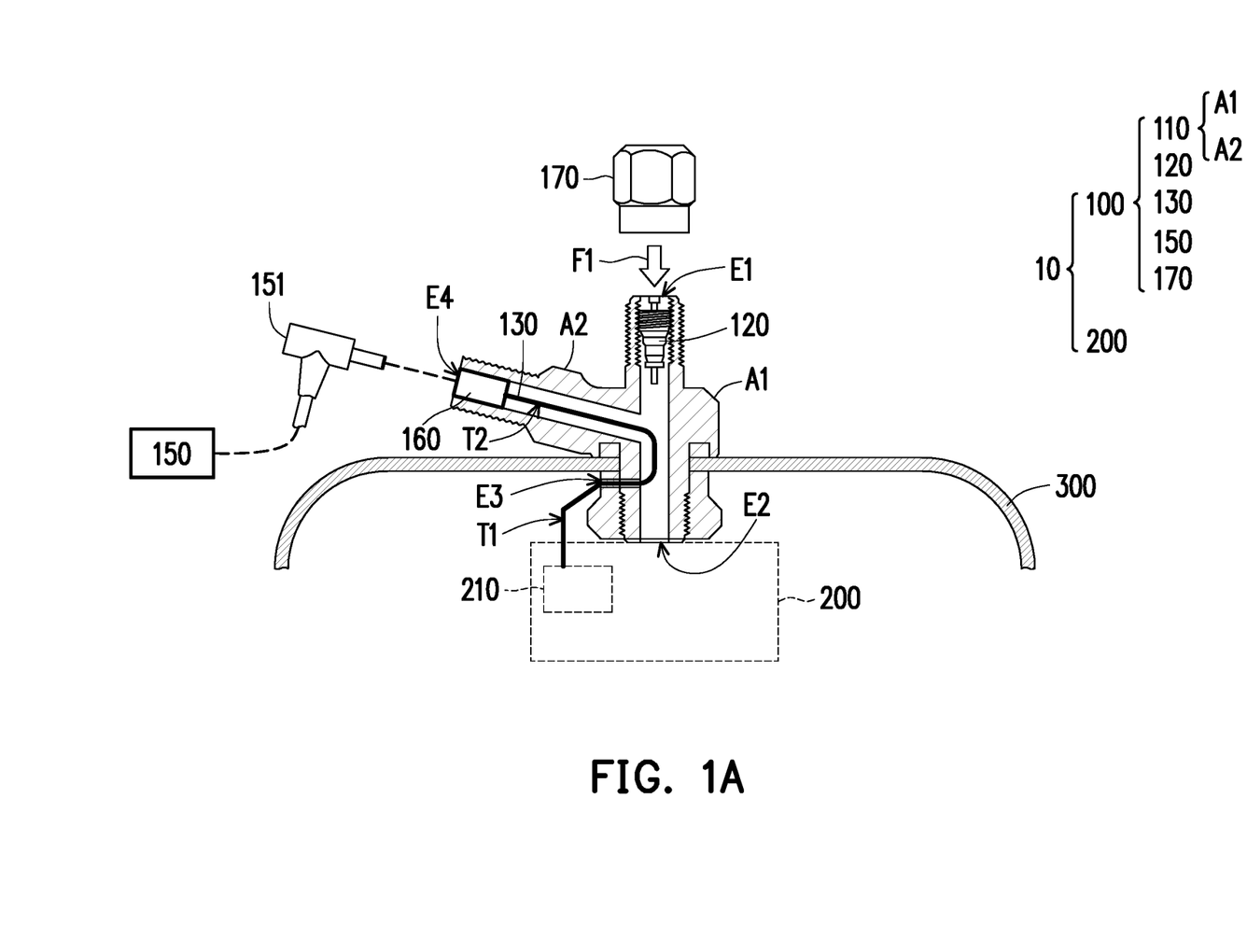
FIG. 1A is a schematic view showing a tire pressure monitoring system according to a first embodiment of the disclosure.

FIG. 1A is a schematic view showing a tire pressure monitoring system according to a first embodiment of the disclosure. With reference to FIG. 1A, in this embodiment, a tire pressure monitoring system 10 includes a valve stem structure 100 and an electronic tire pressure monitoring device 200, wherein the electronic tire pressure monitoring device 200 is adapted to be disposed in a tire 300 and is fixed at a rim via the valve stem structure 100. The electronic tire pressure monitoring device 200 is a set of packaged electronic modules, and includes a pressure sensor, a radio frequency (RF) circuit board and a rechargeable battery cell 210 therein. The valve stem structure 100 is a self-contained valve device. When opened, the valve stem structure 100 allows a compressed air F1 to enter a tubeless tire or a space of an inner tube, and then automatically closes to seal the stored air to generate a pressure, thereby preventing the air from escaping out of the tire or the inner tube. Except for solid tires, all other tires or inner tubes that must be inflated need to use such kind of device for tire inflation. Herein the tire 300 is used to generally stand for all of the aforementioned non-solid tires. When inflation is not performed, a cap nut 170 may be fastened onto a first inlet E1 to provide a protective effect.

Then, in this embodiment, the valve stem structure 100 includes a tube 110, an air core 120, and a conducting wire 130. The tube 110 has the first inlet E1, a first outlet E2, a second outlet E3, and a second inlet E4. The first outlet E2 is disposed in and communicates with an inner space of the tire 300. The air core 120 is switchably disposed in the tube 110 and located at the first inlet E1. The conducting wire 130 is disposed in the tube 110 and extends out of the valve stem structure 100 via the second outlet E3 to be electrically connected to the electronic tire pressure monitoring device 200. Herein the compressed air F1 is adapted to be injected into the valve stem structure 100 via the first inlet E1 and injected into the inner space of the tire 300 via the first outlet E2. That is, as described above, the air core 120 is switched by the compressed air F1 to open a passage (i.e., an inner space of the tube 110) so that the air is smoothly injected into the inner space of the tire 300. When the compressed air F1 is removed, the air core 120 is reset to close the passage so that the injected air is retained in the tire 300 to achieve an inflation effect.

Furthermore, in the valve stem structure 100 of this embodiment, the tube 110 includes a main section A1 and a branch section A2. Herein the main section A1 has the first inlet E1, the first outlet E2 and the second outlet E3, the branch section A2 extends from and communicates with the main section A1, and the branch section A2 has the second inlet E4, as shown by the three-tube structure in FIG. 1A. A battery cell socket 160 is disposed at the second inlet E4. After the battery cell socket 160 is rotated to be screwed into the second inlet E4, the second inlet E4 may achieve an airtight state to prevent the air from escaping from the second inlet E4. The conducting wire 130 passes through the inner space of the tube 110 and extends out of the valve stem structure 100 via the second outlet E3 to enter the inner space of the tire 300. That is, the second outlet E3 is located at the inner space of the tire 300, and a first end T1 of the conducting wire 130 is electrically connected to the rechargeable battery cell 210 of the electronic tire pressure monitoring device 200 as described above, so that charging may be smoothly performed to the electronic tire pressure monitoring device 200. A second end T2 of the conducting wire 130 is electrically connected to the battery cell socket 160.

In this way, a power source 150 is jointed to the battery cell socket 160 via a plug connector 151 of the power source 150 to smoothly transmit electric power to the rechargeable battery cell 210 of the electronic tire pressure monitoring device 200 in the tire 300. In other words, the electronic tire pressure monitoring device 200 disposed in the tire 300, via the conducting wire 130 passing through the main section A1 and the branch section A2 of the tube 110, may obtain power from the power source 150 so as to charge a rechargeable battery (not shown) of the electronic tire pressure monitoring device 200. Accordingly, in the case of the electronic tire pressure monitoring device 200, when the battery is exhausted, it is possible to avoid the necessity of removing the tire 300 in order to replace the battery. As a result, not only is the lifespan of the electronic tire pressure monitoring device 200 prolonged, drivers are also provided with the tire pressure monitoring system 10 that is more convenient. The following should be additionally noted here: even though not shown in FIG. 1A, when it is not necessary to use the battery cell socket 160, a cap nut 170, just like the one at the first inlet E1 of the main section A1 as shown in the drawing, may also provide a protective effect to the second inlet E4 of the branch section A2 in this disclosure.

Figure 1B:
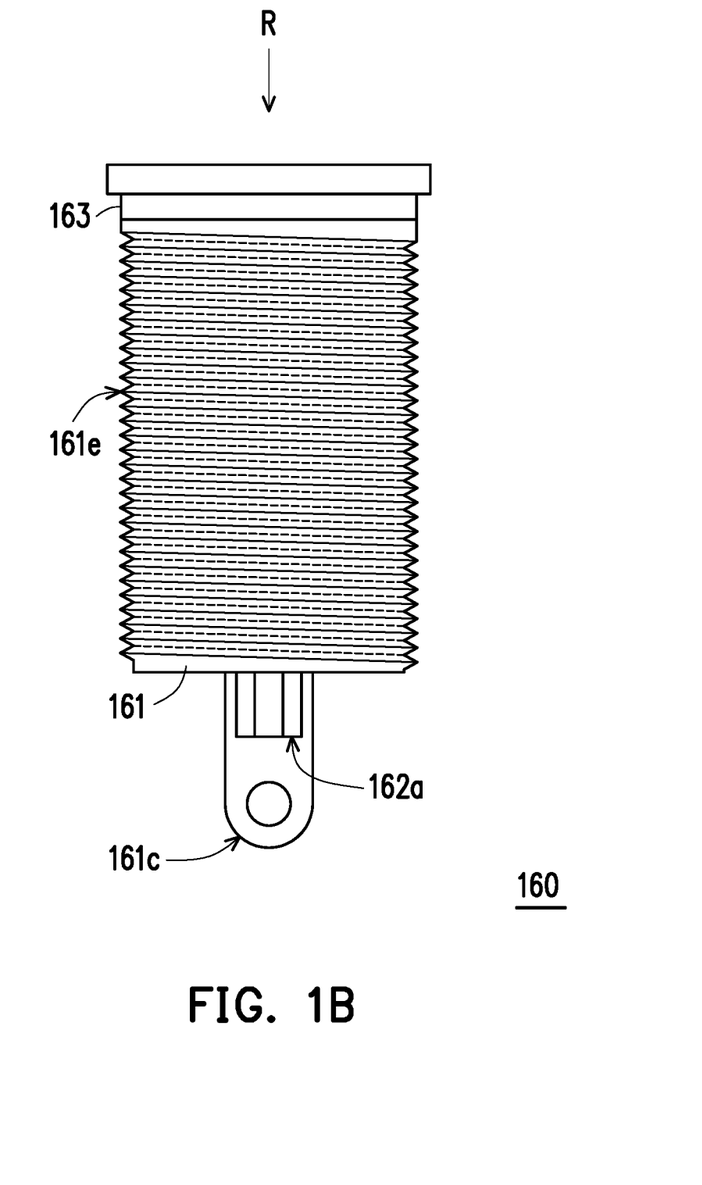
FIG. 1B is a schematic view showing the battery cell socket of FIG. 1A.
Figure 1C:
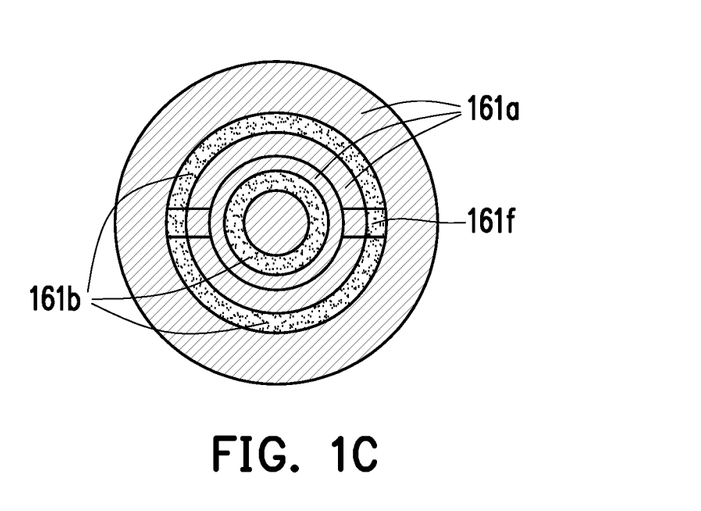
FIG. 1C to FIG. 1F are top views and the corresponding cross-sectional views of the battery cell socket of FIG. 1B.
Figure 1D:
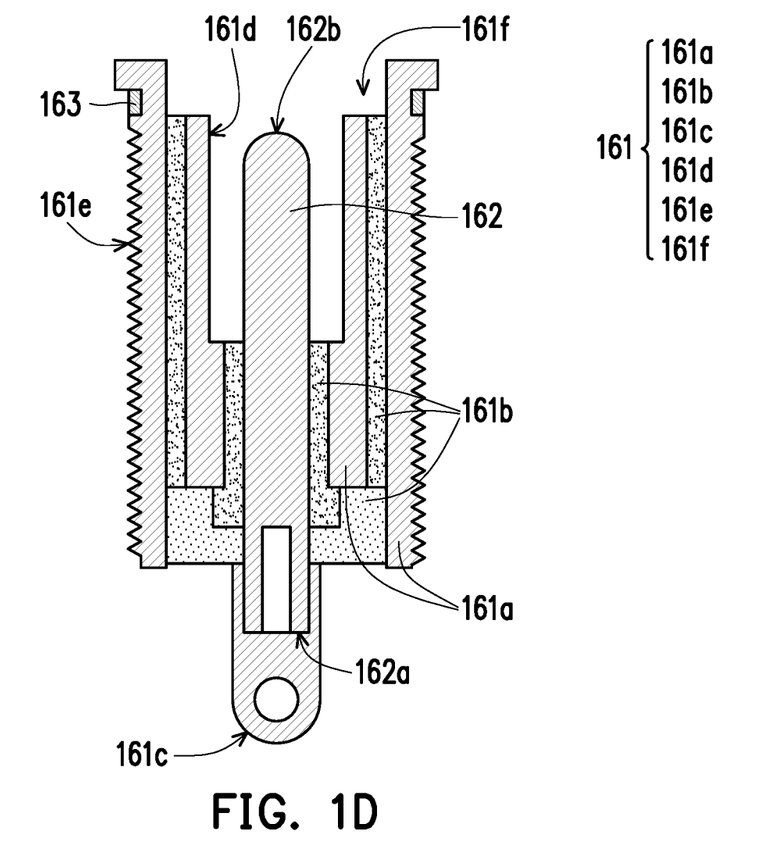
Figure 1E:
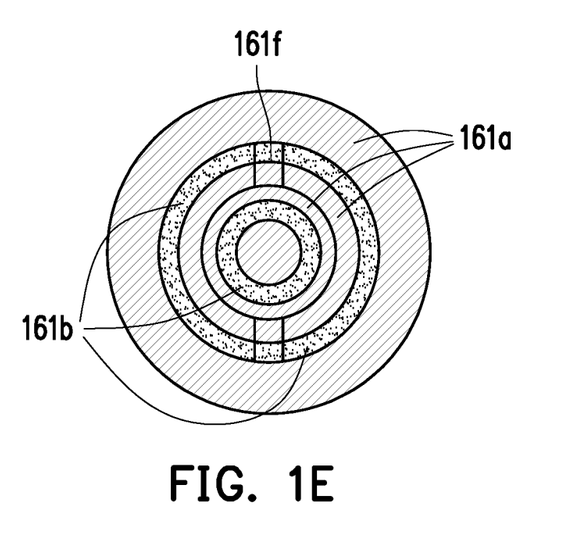
Figure 1F:
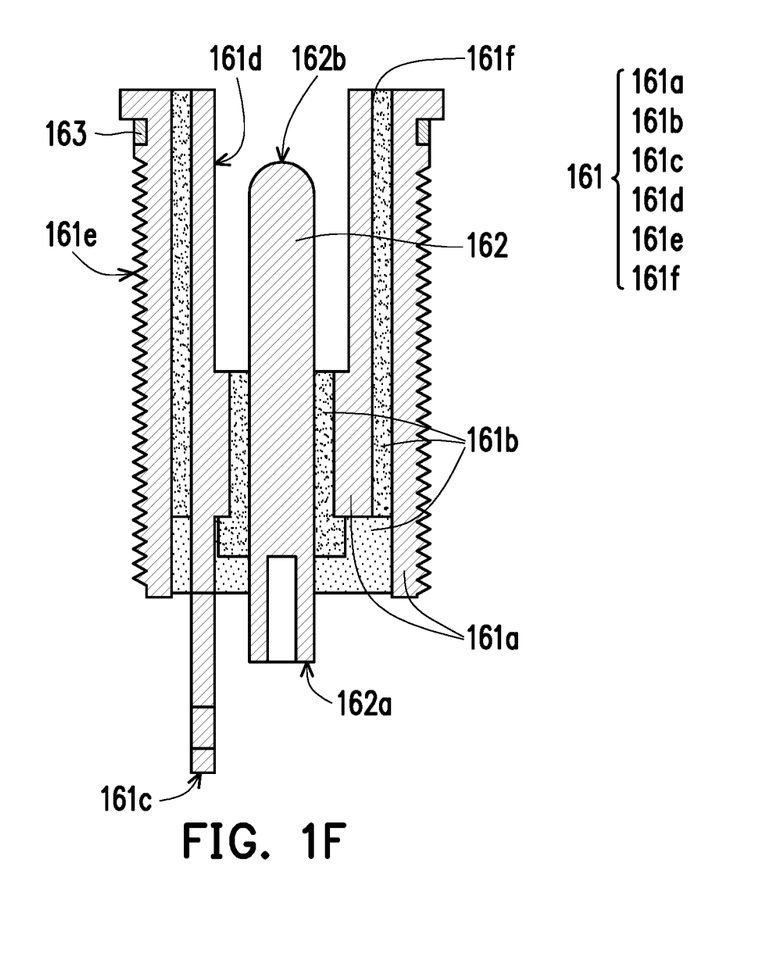

FIG. 1B is a schematic view showing the battery cell socket of FIG. 1A. FIG. 1C to FIG. 1F are top views and cross-sectional views of the battery cell socket of FIG. 1B, wherein FIG. 1C and FIG. 1E are top views, FIG. 1D and FIG. 1F are cross-sectional views, FIG. 1C corresponds to FIG. 1D, and FIG. 1E corresponds to FIG. 1F. With reference to FIG. 1B to FIG. 1F simultaneously, in this embodiment, the battery cell socket 160 includes a base 161, a battery cell 162 and a sealing ring 163. The base 161 is formed by layers of a metal material 161*a* and an insulating material 161*b*. The battery cell 162 is inserted in the base 161 so that the battery cell 162 and the metal material 161*a* and the insulating material 161*b* of the base 161 are concentrically disposed. A connection end 162*a* of the battery cell 162 protrudes out of the base 161 to be electrically connected to an anode of the double-core conducting wire 130, and the base 161 further has a connection end 161*c* adapted to be electrically connected to a cathode of the double-core conducting wire 130. Furthermore, the plug connector 151 of the power source 150 is adapted to be inserted in the base 161 in a direction R so as to be electrically connected to a connection end 162*b* of the battery cell 162 and an inner sidewall 161*d* of the base 161. The connection end 161*c* and the inner sidewall 161*d* are each a part of the integrally formed structure of the metal material 161*a*. Besides, a thread 161*e* is provided on an outer surface of the base 161, and a cut 161*f* is provided on a top portion of the base 161. Herein the thread 161*e* is adapted to be matched with an inner thread (not shown) of the branch section A2 so that a user may apply a force to the cut 161*f* with a tool to screw the battery cell socket 160 into the second inlet E4. After the screwing is performed, the sealing ring 163 is tightly pressed between the battery cell socket 160 and the branch section A2 so that the second inlet E4 is in an airtight state.

Figure 2:
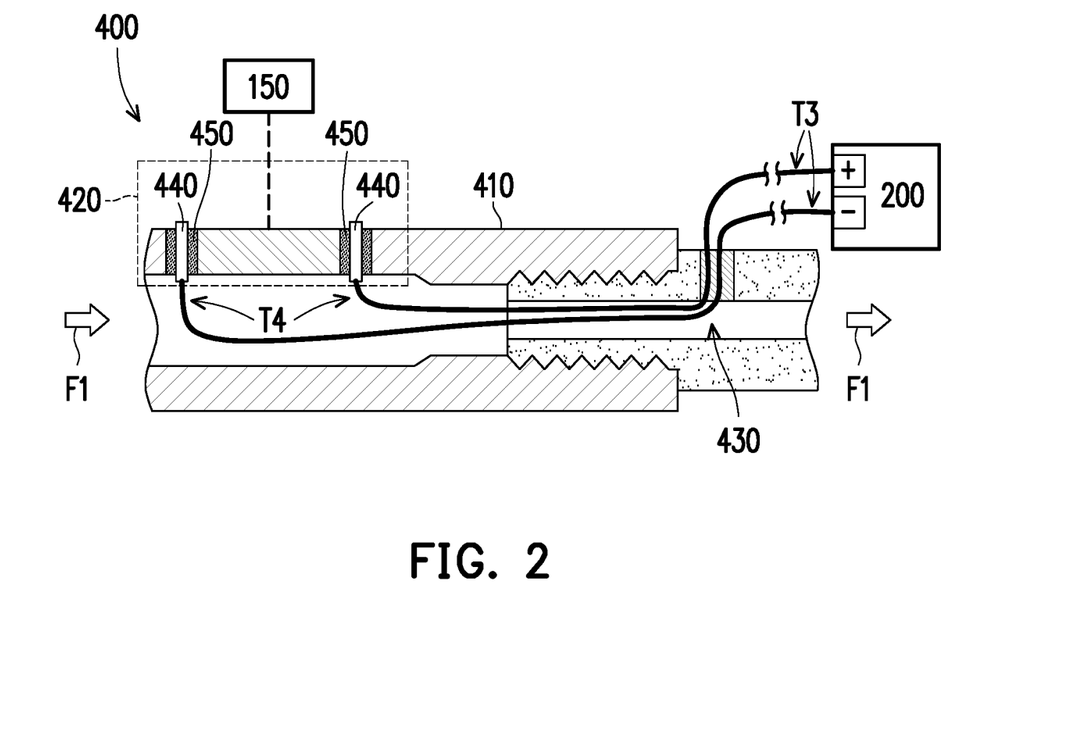
FIG. 2 is a schematic view of a valve stem structure according to a second embodiment of the disclosure.

FIG. 2 is a schematic view of a valve stem structure according to a second embodiment of the disclosure, and this valve stem structure is applicable to the foregoing tire pressure monitoring system 10 as well. Different from the case of the previous embodiment, in a valve stem structure 400 here, a battery cell socket 420 is substantially disposed on a tube wall of a tube 410 and has a substantially uniform contour with an outer surface of the tube 410. An end T3 of a conducting wire 430, just like the first end T1 as described above, extends out of the tube 410 to be electrically connected to an electronic tire pressure monitoring device 200, and another end T4 of the conducting wire 430 is electrically connected to the battery cell socket 420. In this way, when a user joints an electrical connector (not shown) of a power source 150 to the battery cell socket 420 on the tube wall of the tube 410, an effect of power transmission may be achieved. Herein the battery cell socket 420 has magnetic properties or magnetic permeability so that an effect of magnetic attraction may be formed between the electrical connector of the power source 150 and a sidewall of the tube 410 to facilitate the jointing operation of the electrical connector.

Furthermore, an air core in this embodiment is the same as the one in the previous embodiment, and thus is not shown here. Two conductive areas are formed on a partial area of the tube wall of the tube 410, and each of the two conductive areas has a metal protrusion 440 and is magnetic, and each is electrically insulated from the tube 410 by an insulating layer 450. The end T3 of the double-core conducting wire 430 is connected to an anode and a cathode of a rechargeable battery cell of the electronic tire pressure monitoring device 200 respectively, and the other end T4 of the double-core conducting wire 430 is electrically connected to the two metal protrusions 440 respectively. In this way, when the power of the rechargeable battery cell is insufficient, a magnetic charging cable may be used to connect to the partial area so as to charge the rechargeable battery cell. In other words, in this embodiment, the battery cell socket 420 and the tube 410 are an integrally formed structure.

Figure 3:
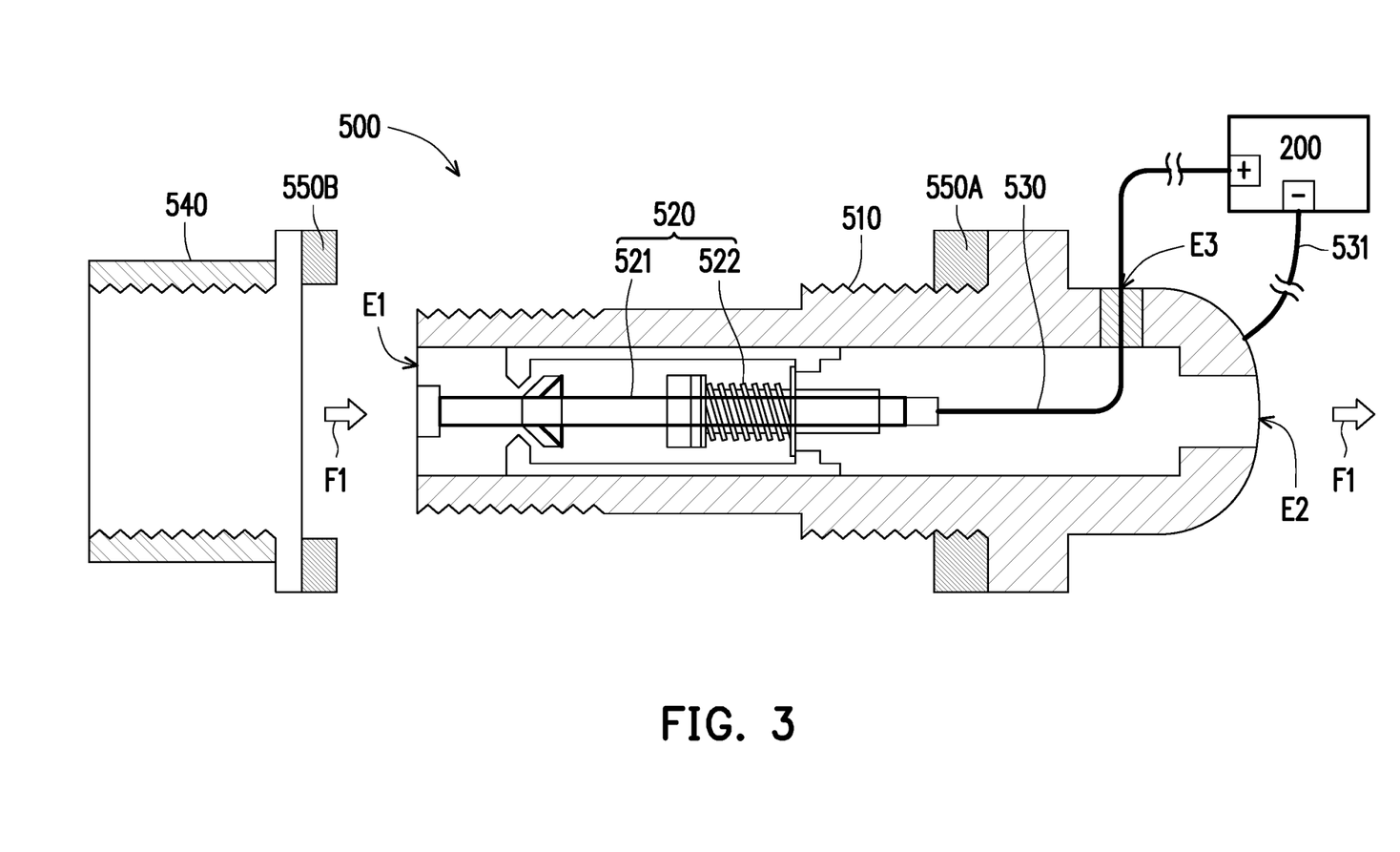
FIG. 3 is a schematic view of a valve stem structure according to a third embodiment of the disclosure.

FIG. 3 is a schematic view of a valve stem structure according to a third embodiment of the disclosure, and this valve stem structure is applicable to the foregoing tire pressure monitoring system 10 as well. Different from the cases of the previous embodiments, in this embodiment, an air core 520 of a valve stem structure 500 is switched by a rod 521 to open and close a passage inside a tube 510, while the rod 521 is reset by an elastic component 522. A plating layer of an insulating material (as shown by the bold line in the drawing) is provided on the middle section of the rod 521 so that the rod 521 is insulated from the main body of the valve stem structure 500 (including other components of the valve stem structure 500 and other structure of the air core 520). An end portion of the rod 521 extends out of the air core 520 to be connected to a single-core conducting wire 530. Herein an end of the conducting wire 530 extends out of the tube 510 to be electrically connected to an anode of a battery cell of an electronic tire pressure monitoring device 200. Different from the cases of the previous embodiments, the rod 521 here is conductive, and another end of the conducting wire 530 is electrically connected to the rod 521 through a passage inside the tube 510. In this embodiment, a single-core conducting wire 531 is additionally provided, and is connected between a cathode of the battery cell of the electronic tire pressure monitoring device 200 and a portion of the valve stem structure 500 in a tire air chamber. Accordingly, in the valve stem structure 500 of this embodiment, a structure at a first inlet E1 of the valve stem structure 500 serves as a structural interface jointed to a power source 150. In other words, the power source 150 is jointed to the first inlet E1 of the valve stem structure 500, and achieves an effect of electrical connection with the electronic tire pressure monitoring device 200 via the conducting wires 530 and 531. At the same time, a compressed air F1 switches the air core 520 also via the first inlet E1 and is injected into a tire (like the foregoing tire 300) via a first outlet E2. Here, in this embodiment, the first inlet E1 of the valve stem structure 500 serves both the functions of inflation and electrical connection. Furthermore, the tube 510 of this embodiment is fastened to a rim of a tire (such as the foregoing tire 300) via a sleeve 540 while being pressed against a sealing ring 550A, so that an airtight state is maintained between the tube 510 and the rim via the sealing ring 550A, and the main body of the valve stem structure 500 is insulated from the rim. Alternatively, a sealing ring 550B may also be additionally provided at the sleeve 540. Accordingly, when the sleeve 540 is fastened to the rim, an airtight state and an effect of electrical insulation may also be maintained via the sealing ring 550B.

Figure 4A:
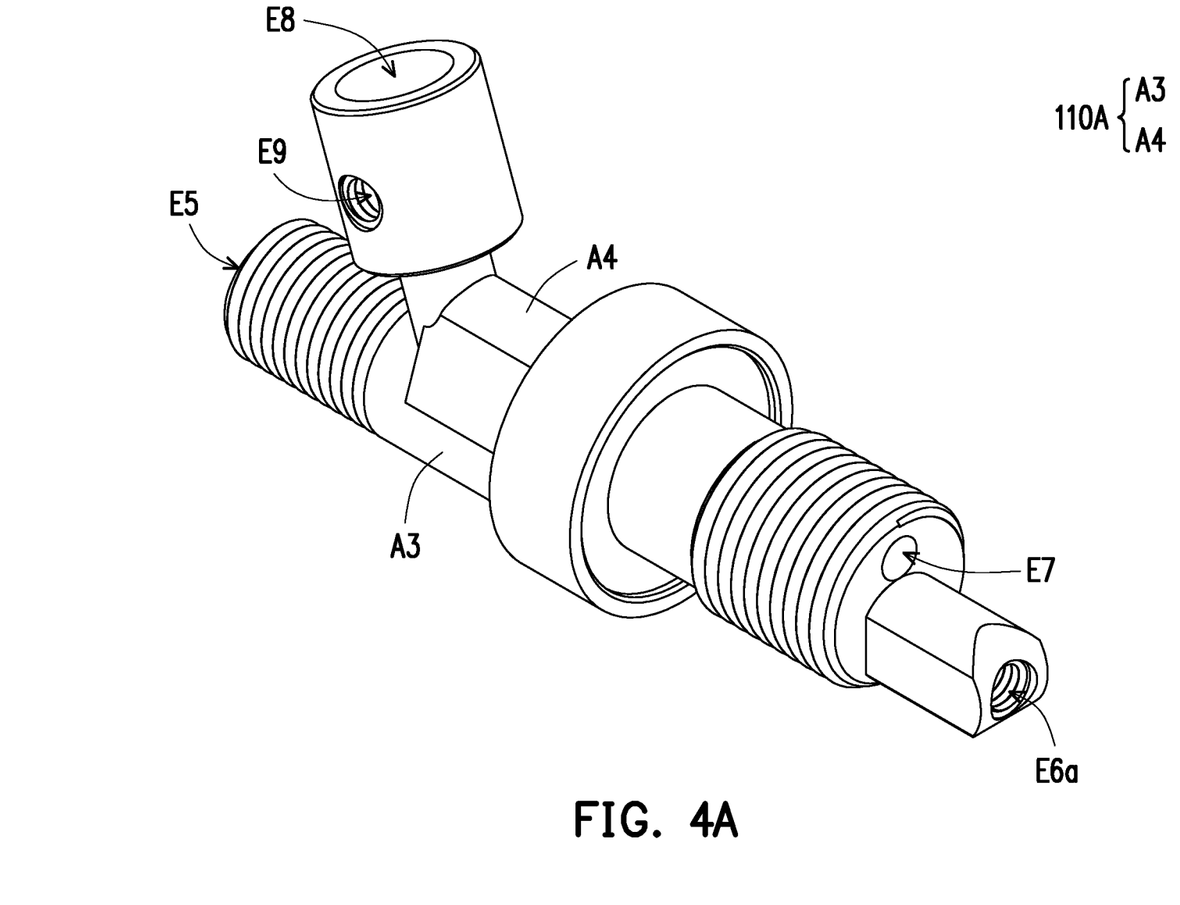
FIG. 4A and FIG. 4B are schematic views showing a valve stem structure from different angles respectively according to a fourth embodiment of the disclosure.
Figure 4B:
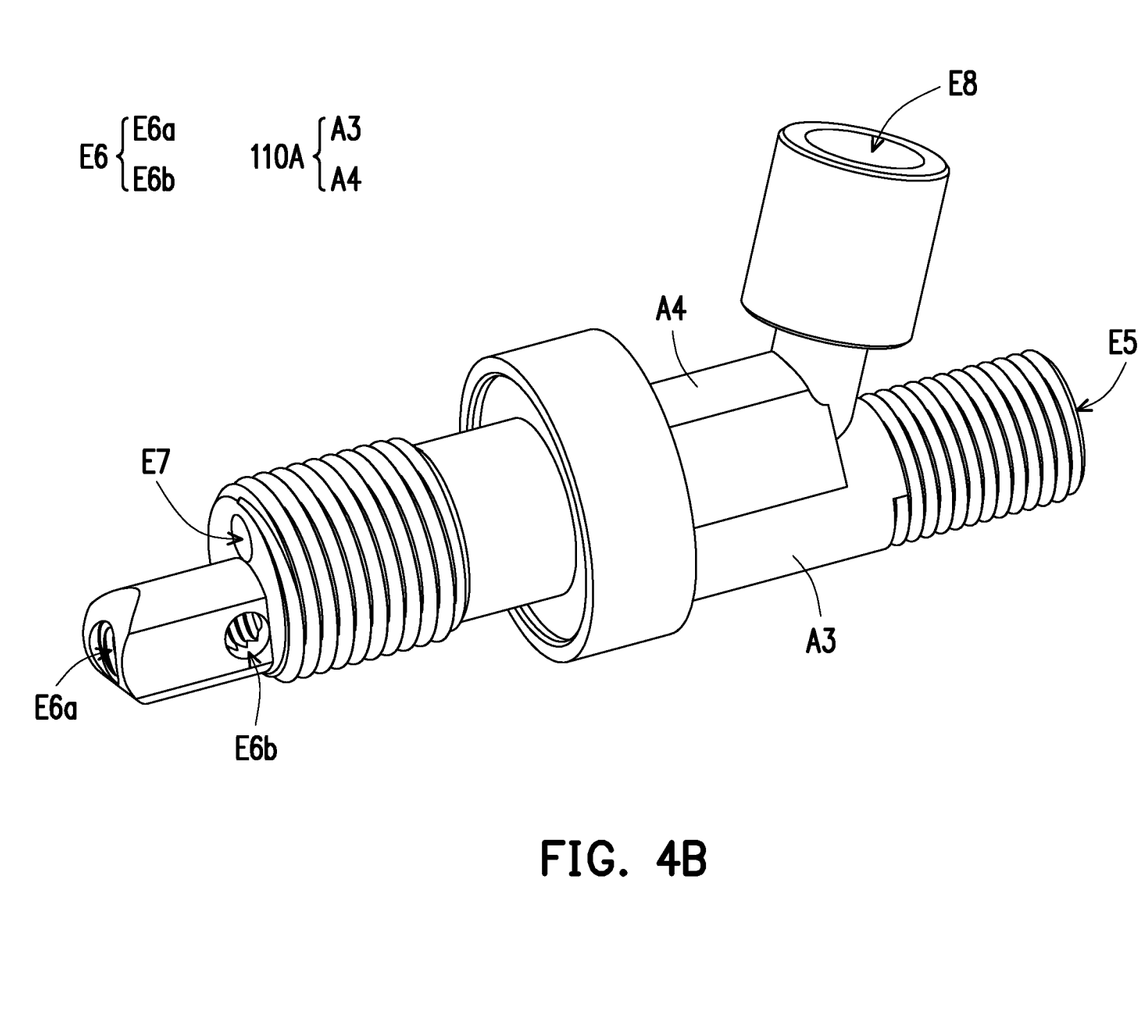
Figure 5:
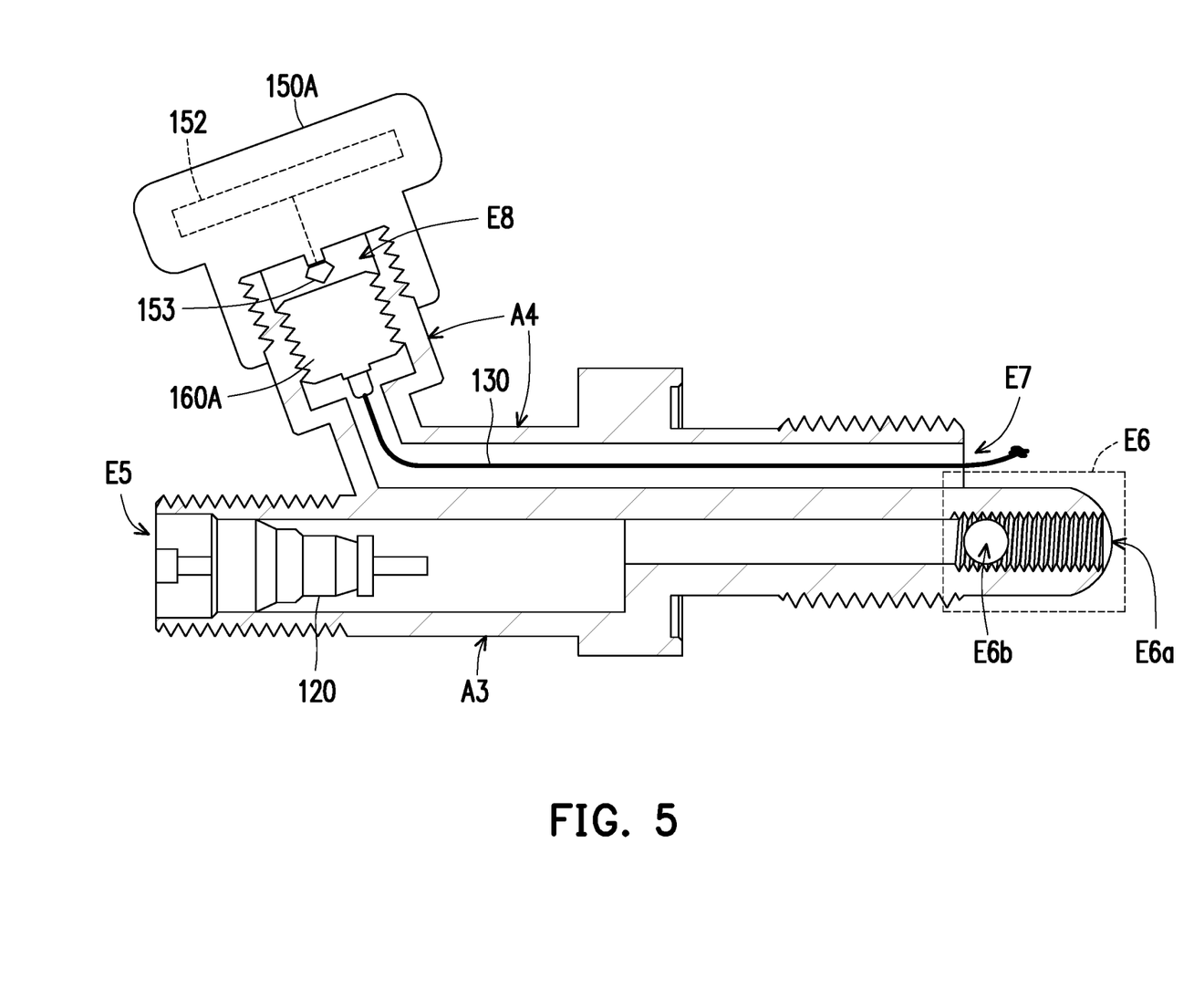
FIG. 5 is a partial cross-sectional view of the valve stem structure of FIGS. 4A and 4B.

FIG. 4A and FIG. 4B are schematic views showing a valve stem structure from different angles respectively according to a fourth embodiment of the disclosure. FIG. 5 is a partial cross-sectional view of the valve stem structure of FIGS. 4A and 4B. With reference to FIGS. 4A, 4B and 5 simultaneously, in the fourth embodiment, a tube 110A of the valve stem structure is an integrally formed structure and is divided into a main section A3 and a branch section A4, and more importantly, a passage of the main section A3 and a passage of the branch section A4 are structurally separated and independent from each other. It should be noted that other components and features not illustrated in FIG. 5 may already be known from the embodiment of FIG. 1A.

Specifically, as shown in FIG. 5 (please refer to FIG. 1A simultaneously), the passage of the main section A3 has a first inlet E5 and a first outlet E6. An air core 120 is disposed at the first inlet E5. The first outlet E6 extends into an inner space of a tire 300 so as to be connected to an electronic tire pressure monitoring device 200. A compressed air F1 is adapted to be injected into the valve stem structure via the first inlet E5 and injected into the inner space of the tire 300 via the first outlet E6. Here the first outlet E6 includes a sub outlet E6a and a sub outlet E6b, wherein the sub outlet E6a is connected to the electronic tire pressure monitoring device 200 that the air injected into the tire 300 is measured on its related pressure and temperature parameters by the pressure monitoring device 200. The air is injected into the inner space of the tire 300 via the sub outlet E6b.

Furthermore, the passage of the branch section A4 and the passage of the main section A3 are structurally separated, and the branch section A4 has a second inlet E8 and a second outlet E7. In this embodiment, a power source 150A is, for example, a battery box detachably assembled to the second inlet E8, and a battery 152 and a conductive spring 153 electrically connected to the battery 152 are disposed inside the battery box. A battery cell socket 160A is adjustably disposed in the branch section A4 along an extending direction of the passage and is adjacent to the second inlet E8 while electrically contacting the conductive spring 153. The conductive spring 153 is, for example, fastened by a fastening component (not shown) through an adjustment hole E9 and fixes the battery cell socket 160A. Besides, a side of the battery cell socket 160A opposite to the battery box is connected to a conducting wire 130 that extends out of the second outlet E7 through the passage of the branch section A4, so that the battery cell socket 160A is electrically connected to the electronic tire pressure monitoring device 200. In this way, the battery box may supply power to the electronic tire pressure monitoring device 200 via the battery cell socket 160A and the conducting wire 130.

In the fourth embodiment, by the aforementioned configuration in which the main section A3 and the branch section A4 are an integrally formed structure but are also separated and independent from each other (that is, the branch section A4 that serves as an electricity passage and the second inlet E8 and the second outlet E7 thereof are substantially separated from the main section A3 that serves as an air passage and the first inlet E5 and the first outlet E6 thereof), mutual interference between electricity and air may be effectively avoided. At the same time, such configuration may also optimize the main section A3 and the branch section A4 so as to effectively reduce the length of the tube 110A, thereby avoiding the situation where the portion of the tube 110A protruding out of the tire 300 is too long and thus easily impacted and damaged during driving.

Figure 6A:
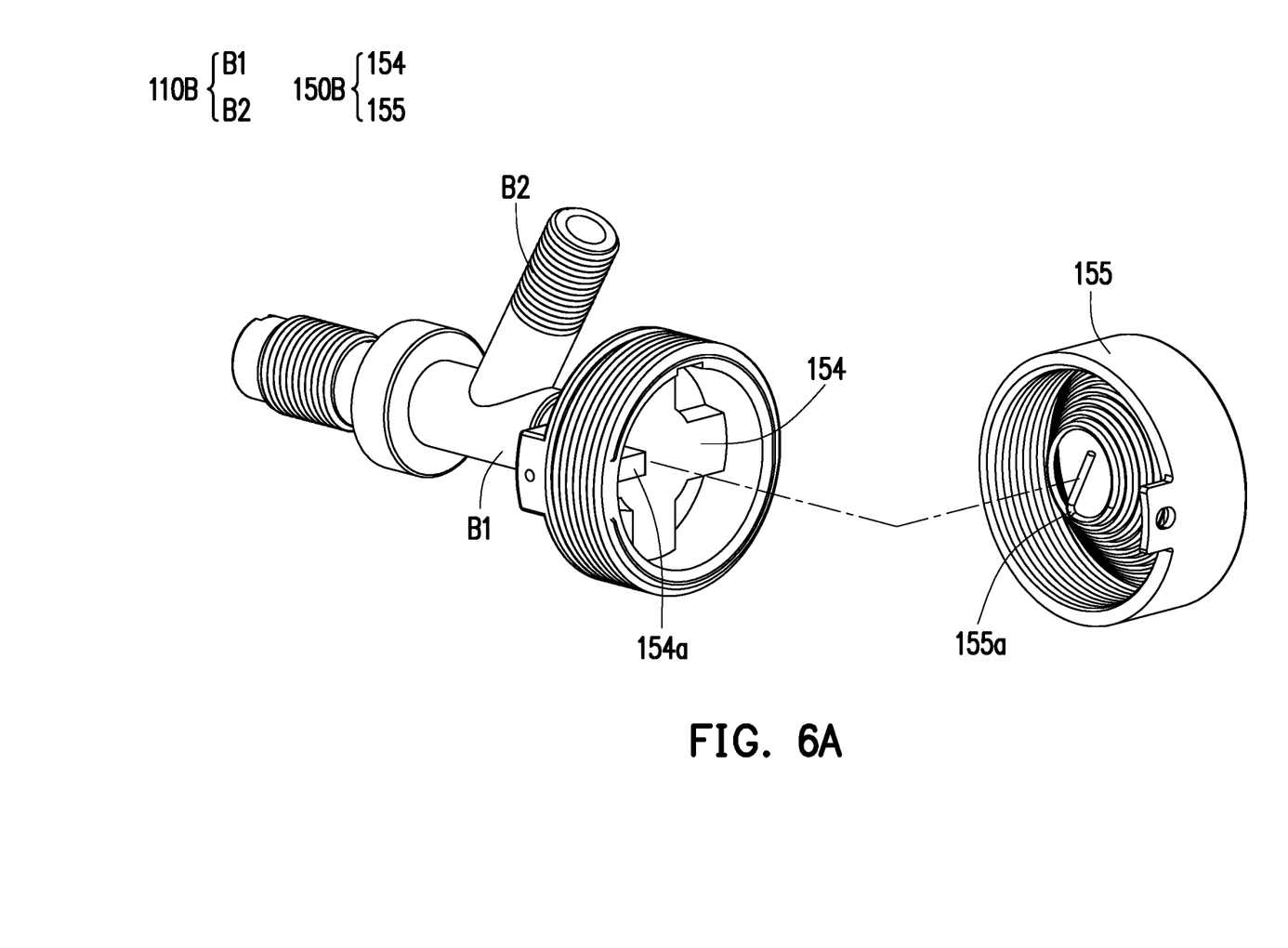
FIG. 6A is an exploded view of a valve stem structure according to a fifth embodiment of the disclosure.
Figure 6B:
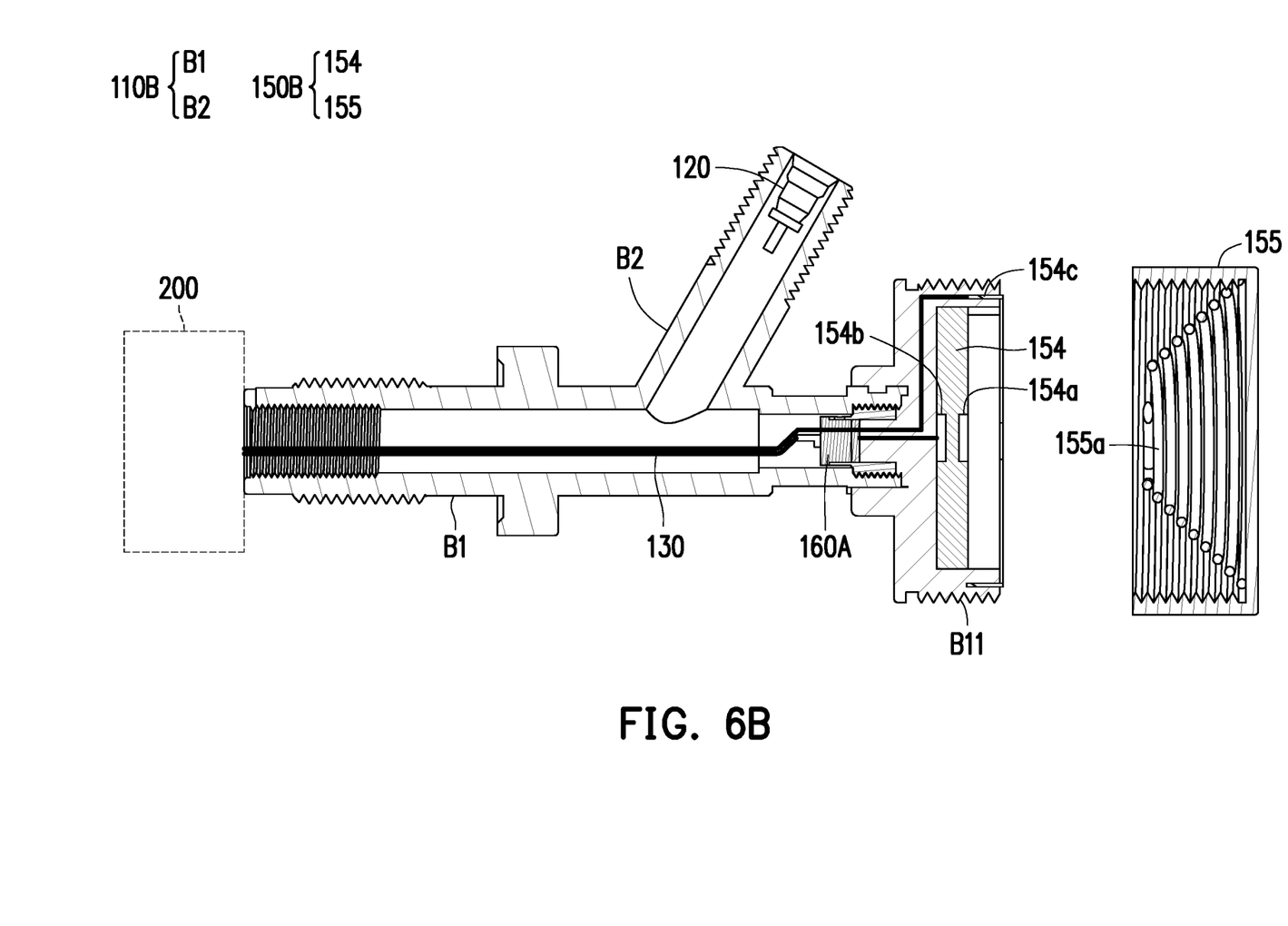
FIG. 6B is a cross-sectional view of the valve stem structure of FIG. 6A.

FIG. 6A is an exploded view of a valve stem structure according to a fifth embodiment of the disclosure. FIG. 6B is a cross-sectional view of the valve stem structure of FIG. 6A. With reference to FIGS. 6A and 6B simultaneously, in the fifth embodiment, a tube 110B of the valve stem structure is an integrally formed structure and is divided into a main section B1 and a branch section B2, and more importantly, a passage of the main section B1 and a passage of the branch section B2 are communicated with each other. It should be noted that other components and features not illustrated in FIG. 6A and FIG. 6B may already be known from above embodiments.

Specifically, an air core 120 is disposed at the branch section B2, and a power source 150B, for example, a battery box, is fixed at an end of the main section B1, wherein a battery cell socket 160A is also disposed at the end of the main section B1 to be electrically connected to a battery 154 of the power source 150B. In this way, the battery 154 may supply power to the electronic tire pressure monitoring device 200 via the battery cell socket 160A and a conducting wire 130 by passing through the main section B1. In the embodiment, the power source 150B further comprises a cover 155 for covering and being electrically connected to conducting piece 154c, such that the electrodes 154b & 154a of the battery 154 is electrically connected to the battery cell socket 160A, and the electrode 154a being faced toward a conducting spring 155a of the cover 155 is connected to the socket 160A through the conducting piece 154c. While the cover 155 being assembled to the portion B11, the conducting spring 155a is contacted and electrically connected the conducting piece 154c with the electrode 154a. Therefore, a circuit loop is formed by the battery cell socket 160A, the battery 154, the cover 155, and the conducting piece 154c.

In summary, in the embodiments of the disclosure, the valve stem structure and the tire pressure monitoring system using the same are equipped with the conducting wire disposed in the inner space of the tube. Accordingly, not only is the function of tire inflation provided by the valve stem structure, power and signal transmission may also be provided to the electronic tire pressure monitoring device by the conducting wire that serves as a medium of electrical connection. In this way, it is not necessary to remove the tire to replace the battery of the electronic tire pressure monitoring device disposed inside the tire when battery is exhausted. As a result, the user's convenience is improved and the cost of use is reduced.

In the foregoing embodiments, the branch section connected onto the tube may be used as a passage for the conducting wire to extend out of the valve stem structure; the connector may also be directly disposed on the sidewall of the tube so that the power source is directly jointed to the connector on the sidewall of the tube; and the rod of the air core of the valve stem structure may also be directly used as the medium for electrical conduction. All of the foregoing methods may successfully achieve the effect of electrical connection with the electronic tire pressure monitoring device.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A valve stem structure disposed at a rim of a tire of a vehicle for connecting to an electronic tire pressure monitoring device, wherein the electronic tire pressure monitoring device is disposed in the tire, the valve stem structure comprising:
    a Y-type tube having a main section, a branch section extending from the main section, and a screwing cap, wherein each of the main section and the branch section has an inlet, and the main section has at least one outlet;
    a battery and a battery cell socket electrically connected to each other, wherein both of the battery and the battery cell socket are disposed at a same one of the inlets;
    an air core switchably disposed in the tube and located at another one of the inlets, wherein a compressed air is injected into the valve stem structure via the another one of the inlets by switching the air core and is injected into the tire via the at least one outlet; and
    a conducting wire disposed in the tube, one end of the conducting wire extending out of the valve stem structure via a second outlet to be electrically connected to the electronic tire pressure monitoring device, and another end of the conducting wire electrically connected to the battery cell socket, wherein the battery supplies power to the electronic tire pressure monitoring device after the screwing cap screwed to the inlet at which the battery and the battery cell socket are disposed.

2. The valve stem structure as recited in claim 1, wherein the battery is jointed to the battery cell socket to supply power to a rechargeable battery of the electronic tire pressure monitoring device via the battery cell socket and the conducting wire.

3. The valve stem structure as recited in claim 1, further comprising a conducting spring disposed on the screwing cap, wherein the battery is disposed in the screwing cap and electrically connected to the conducting spring, when the screwing cap is screwed to the inlet at which the battery cell socket is disposed, the battery is electrically connected to the battery cell socket by the conducting spring leaning against the battery cell socket.

4. The valve stem structure as recited in claim 1, further comprising a conducting spring disposed on the screwing cap and a conducting piece disposed in the inlet of the main section, wherein the battery and the conducting piece are electrically coupled to each other via the conducting spring after the screwing cap screwed to the inlet, such that the electronic tire pressure monitoring device, the conducting wire, the battery, the conducting piece, and the conducting spring are electrically coupled to each other.

5. The valve stem structure as recited in claim 1, wherein the air core has a rod that is conductive, an end of the conducting wire is electrically connected to the electronic tire pressure monitoring device, another end of the conducting wire is electrically connected to the rod, and the battery is jointed to the rod of the air core to offer electric energy for the pressure monitoring device for its function.

6. The valve stem structure as recited in claim 5, wherein an insulating layer is provided on a surface of the rod so that the rod is insulated from other structures of the air core.

7. The valve stem structure as recited in claim 4, wherein the air core is disposed in the branch section communicating to the main section, and a flowing path of the compressed air is partially overlapped with the conducting wire in the main section.

8. The valve stem structure as recited in claim 3, wherein a passage of the main section and a passage of the branch section are structurally separated and independent from each other.

9. The valve stem structure as recited in claim 4, wherein the battery has a pair of electrodes located on opposite sides of the battery, the conducting wire is electrically connected to one of the electrodes, and the conducting spring is electrically connected to another one of the electrodes after leaning against the battery.

10. A tire pressure monitoring system, comprising:
an electronic tire pressure monitoring device disposed in a tire of a vehicle; and
a valve stem structure as recited in claim 1.

11. The tire pressure monitoring system as recited in claim 10,
wherein the battery is jointed to the battery cell socket to supply power to a rechargeable battery cell of the electronic tire pressure monitoring device via the battery cell socket and the conducting wire.

12. The tire pressure monitoring system as recited in claim 10, further comprising a conducting spring disposed on the screwing cap, wherein the battery is disposed in the screwing cap and electrically connected to the conducting spring, when the screwing cap is screwed to the inlet at which the battery cell socket is disposed, the battery is electrically connected to the battery cell socket by the conducting spring leaning against the battery cell socket.

13. The tire pressure monitoring system as recited in claim 10, further comprising a conducting spring disposed on the screwing cap and a conducting piece disposed in the inlet of the main section, wherein the battery and the conducting piece are electrically coupled to each other via the conducting spring after the screwing cap screwed to the inlet, such that the electronic tire pressure monitoring device, the conducting wire, the battery, the conducting piece, and the conducting spring are electrically coupled to each other.

14. The tire pressure monitoring system as recited in claim 10,
wherein the air core having a rod that is conductive material and partial coated with an insulating film to be insulated from the air code, an end of the conducting wire is electrically connected to the electronic tire pressure monitoring device, another end of the conducting wire is electrically connected to the rod, and the battery is jointed to the rod of the air core to offer electric energy for the pressure monitoring device for its function, wherein an insulating layer is provided on a surface of the rod so that the rod is insulated from other structures of the air core.

15. The tire pressure monitoring system as recited in claim 13, wherein the air core is disposed in the branch section communicating to the main section, and a flowing path of the compressed air is partially overlapped with the conducting wire in the main section.

16. The tire pressure monitoring system as recited in claim 12, wherein a passage of the main section and a passage of the branch section are structurally separated and independent from each other.

17. The tire pressure monitoring system as recited in claim 13, wherein battery has a pair of electrodes located on opposite sides of the battery, the conducting wire is electrically connected to one of the electrodes, and the conducting spring is electrically connected to another one of the electrodes after leaning against the battery.

* * * * *